June 10, 1930.  C. KESSES  1,762,396
PARACHUTE FOR AEROPLANES
Filed Oct. 24, 1928
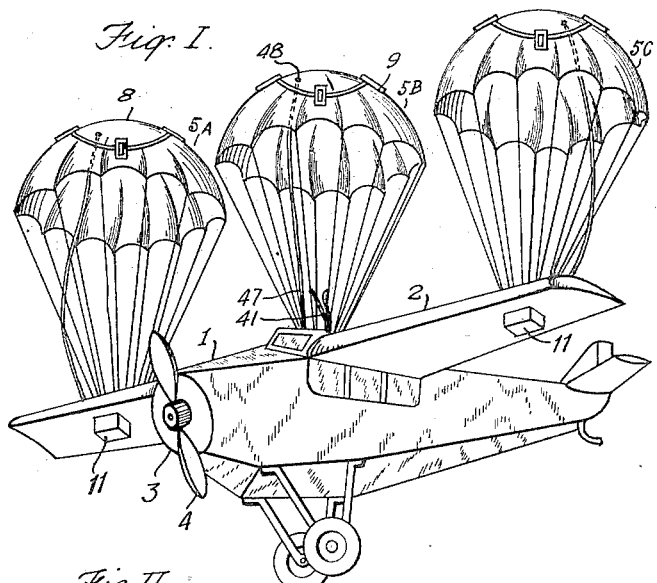
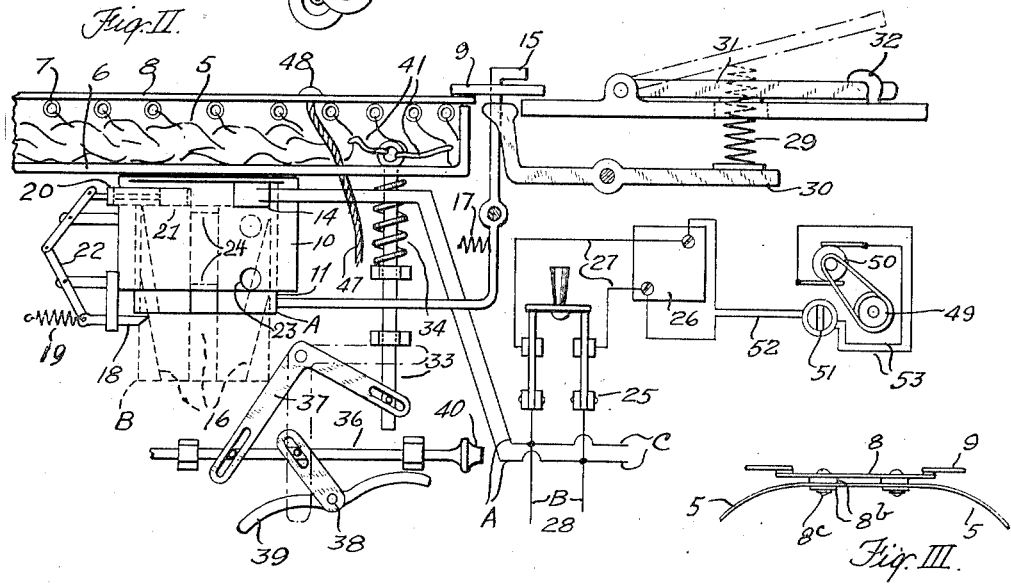
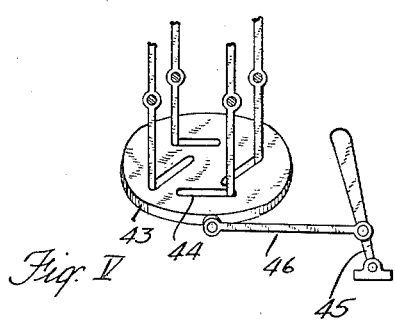
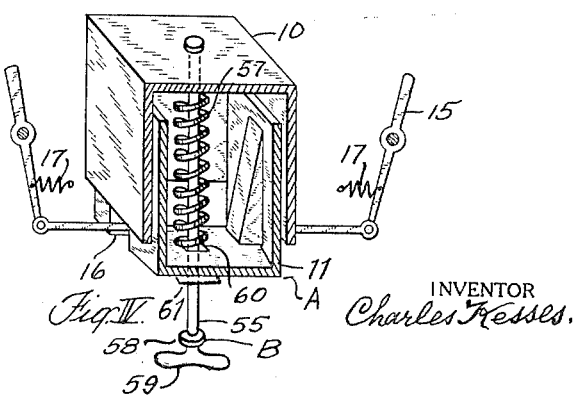
INVENTOR
Charles Kesses.

Patented June 10, 1930

1,762,396

UNITED STATES PATENT OFFICE

CHARLES KESSES, OF NEW YORK, N. Y.

PARACHUTE FOR AEROPLANES

Application filed October 24, 1928. Serial No. 314,651.

The objects in this application are; to save lives from unexpected accidents and tailspins in the air, or by landing an aeroplane on unsuitable ground.

First; to have a device to release and to force by the pressing of an electric button one or a number of parachutes in one moment into the air to carry an aeroplane safely to the ground.

Second; to have means to release and to force by the moving of a lever a parachute in the air to carry an aeroplane to the ground.

Third; to have means to lock each one of the springs which force the parachute in the air in separate fixed positions.

Fourth; to have means to turn the innerside of one or of a number of parachutes outward by the turning of a switch to start this operation after the landing of the aeroplane.

Fifth; to have means to use indirect pressure on the springs, to prevent the entanglement of the parachute with said springs.

Sixth; to have means to close the feed line of the engine and to stop the propeller in a horizontal direction through the carrying of said aeroplane with said parachutes.

Seventh; to have closed compartments for the parachutes inserted in the wings and in the plane member, to prevent the opening of said parachutes during the flying of the plane.

Eighth; to have another device to release and to force with springs instead of the powder charge a parachute in the air.

Ninth; to have means provided which is useful for a pilot, or on an aeroplane, or a member, to release the cords of a parachute by the landing and to hold said parachute with a cord which is secured from the inner side to the center of said parachute.

Tenth; to have attachable means provided to connect each one of the steel plates to a part of the edge of said parachute to open and to fill the parachutes quickly with air after the same are forced in the air to carry the aeroplane.

The form of the invention is illustrated in the accompanying drawings in which Fig. I is a perspective view of an aeroplane shown from below, which is being carried by three parachutes.

Fig. II is a side view of a device to release and to force a parachute in the air and showing the means to close the feedline of the engine and to stop a propeller in a horizontal position.

Fig. III is a side view of the means to secure the cover of a box to the upper part of a parachute.

Fig. IV is a perspective view of the boxes 10 and 11 with the front walls taken away, showing the means to release a parachute with a spring instead of a powder charge.

Fig. V is a perspective view of the lower part of the device, arranged to release and to force a parachute in the air by the pulling of a lever.

Similar numbers refer to similar parts throughout the several views.

A member 1 constitutes the frame work of the aeroplane, its wings 2 being secured in a suitable manner to said member. An engine 3 for driving a propeller 4 is secured in said member. Parachutes 5A, 5B and 5C are arranged in open boxes 6 which are secured one each near the ends and in the wing and one in the member 1. The rings 7 for holding the cords of the parachute are secured in a circular manner and even spaced on the upper rim of said boxes. A cover 8 of light flexible but durable material is secured to the upper part of said parachute and arranged to cover said parachute in said box. A form to secure said cover is being shown in Fig. III. A number of small openings are arranged in a circle in said cover and corresponding openings in the upper part of said parachute. Suitable bindings must be provided around the edges of said openings, soft rubber washers $8^b$ on either side of said openings. Bolts $8^c$ which are supported on either side by aluminum washers must be used to press all these parts securely together. Steel plates 9 having openings in the center are secured on each one of the corners of said cover. A second open box 10 is with its opening downward secured to the bottom of said first box. A third open box 11 is being fitted in said second box in such a manner to close said box. An electric device 15 for exploding a charge of powder is secured in the upper part of the box 10 and is arranged for holding said charge. Levers 15 having the form of a Z are secured in a vertical position with a pin in its center in the inner side of the wing 2. Said levers are positioned one on each side of the boxes 6, 10 and 11 their upper parts must fit through the openings in the steel plates 9 and the lower parts must fit in slanting grooves 16 which are arranged in a vertical position in the walls of the box 11. Said grooves increase its depth downward. Springs 17 are provided to press said levers in said grooves, and to hold with the upper parts of said levers the steel plates 9 in such a position to close the box 6 with the cover 8. Sliding bolts 18 are secured to the box 10 in such a position to hold the box 11 at its upper position A and springs 19 are provided to press said bolts underneath the box 11. Cylinders 20 with pistons 21 are secured in the upper part of the wall of the box 10. Levers 22 are connected together with pins and the center of each lever secured to said box. One end of one lever is arranged on said piston and one end of the second lever to said sliding bolt 18 in such a position to release the box 11 from said bolt by the outward pressing of said piston. Exhaust openings 23 are provided to release over pressure through the exploding of the powder charge. One of said openings is near the bottom in the box 10 and a second opening near the top in the box 11 at such positions to move over each other when the box 11 is at its lowest position B. An extension 24 is secured in the upper part of the grooves 26 and a second extension on the lower rim of the box 10 to engage each other to prevent the falling of the box 11 out of the box 10. A storage battery 26 is provided to supply the current and a switch 25 is arranged near the pilot. Two line conduits 27 connect the circuit between said switch and said battery and two line conduits 28A, 28B and 28C between said switch and to each one of the electric devices 14 to explode said powder charges.

A device to force with indirect pressure of the springs 29 the steel plates 9 with cover 8 and parachute 5 in the air, consists of a lever 30 which is with a pin in its center secured to the member 1. A spring 29 which is secured to one end of said lever must extend out of a suitable opening in the member 1. The other end of said lever is divided in two parts and arranged in such a manner to press from below against each side of the steel plates 9 without interfering with the levers 15. One end of a lever 31 is secured to the member 1 to provide means to compress said spring with said lever. A lock 32 is provided to lock said lever to the member 1.

A device to release and to force by the moving of a lever a parachute in the air is being shown in Fig. IV. The before specified device without the boxes 10 and 11 is used for this purpose. A round plate 43 is with a pin in its center secured in a suitable position. Four long openings 44 are arranged in said plate for holding the lower parts of the levers 15 in a fixed position. Said openings are positioned in such a manner to hold with said slots the upper parts of said levers on the steel plates 9 and by turning said plate to release said 4 steel plates. A handy lever 45 for the pilot is with one end secured in a suitable position and a connecting member 46 is arranged on the edge of said round plate and to the center of said lever to provide means to release said steel plates by moving said lever.

Another device to release a parachute is being shown in Fig. V. The boxes 6, 10 and 11 are used for this purpose and a spring 57 instead of the powder charge. One end of a rod 55 is arranged to turn in the bottom of the box 10. Said rod must be secured in such a manner to give said rod a fixed position in the center of an oblong opening 60 which is provided in the bottom of the box 11. An oblong member 61 which must have the size to pass through said oblong opening is secured to the rod 55 in such a position to be underneath the box 11 when the spring 57 is in a compressed condition. Said spiral spring is secured to the bottoms of the boxes 10 and 11 and must not interfere with the movement of said oblong member. A member 58 is secured to the rod 55 to hold the box 11 at its lowest position B. A handy member 59 for the pilot is secured to the lower end of said rod.

To operate this device then compress the spring 57 with the box 11 to the position A till the oblong member 61 is underneath the box 11, then turn the handy member 59 one-half turn to hold said spring in a compressed condition. The springs 17 press the levers 15 in the slanting grooves 16 to lock with the upper parts of said levers the steel plates 9 to the plane, then use the levers 31 to compress the springs 29 and secure said levers with the lock 32 to the member 1.

To release the parachute, then move the handy member 59 one-half turn, the spring 57 presses the box 11 to the position B, the slanting grooves 16 move the levers 15 in a position to release at one moment all four steel plates 9 and the springs 29 force said platen with the cover 8 and the parachute 5 in the air to carry the plane safely to the ground.

To stop through the carrying of the aeroplane by said parachutes the engine and to stop the propeller in a horizontal position, a member 33 is arranged for sliding in a vertical position in an opening in the box 6. A spring 34 is arranged below said box to pull said member in that direction. A member 36 is arranged for sliding in a transverse direction to said first member and a lever 37 to move said second member through the movements of said first member. A valve 38 on the feed line 39 of the engine is operatively connected to said second member. Short steel plates 40 are secured on one end of said member to stop the propeller 4 at a fixed position and to close said valve by the forward movement of said member. Two cords 41 are secured to said first member and to the nearest cords of the parachute and arranged in such a manner to pull said second member through the movement of said first member through the carrying of the aeroplane with said parachute to close said valve and to stop said propeller.

To open the parachute quickly after it is forced in the air, attachable means must be secured to each one of the steel plates 9 and to a part of the edge of the parachute (not shown) to lift with said steel plate said parts to open and to fill said parachute quickly. Said attachable means must be of medium strength and must release as soon as the plane is carried by said parachute.

To turn by the landing of the aeroplane said three parachutes like closed umbrellas upside down, for this purpose are cords 47 secured with a member 48 through the inner side of the parachute to the cover 8. The other ends of said cords are led through openings in the bottoms of the box 6 and secured to a roller 49 which turns in suitable brackets. A motor 51 is with a belt operatively connected to said roller. A switch 51 for the pilot to start said motor. Two line conduits 52 to close the circuit between the storage battery 26 and said switch and two line conduits 53 from said switch to said motor, to provide means to wind up said cords on said roller to turn the inner side of said three parachutes outward by the turning of said switch.

The co-operation of the several parts throughout a complete cycle of movements involved to release and to force through the exploding of small amount of gunpowder three parachutes in one moment in the air to carry an aeroplane which is in case of need through unexpected accident, or tail spin, or to land safely on unsuitable ground; second, showing the means to stop in such case the engine and to stop the propeller in a horizontal direction through the carrying of said aeroplane by said parachutes; third, to take the air out of said three parachutes after the landing of said plane. The boxes 6 must be large enough to pack the parachutes without crowding from all sides in said boxes; if packed this way it will not crack the silk and will prolong the life of the parachute. Rings 7 for holding the cords of the parachute are secured in even spaces around the upper rims of said boxes and attachable means (not shown) are provided on each one of the steel plates 9 and to parts of the edge of the parachute to connect said parts and to lift said edge with said steel plates, to open and to fill said parachute quickly. Said attachable means must be of medium strength and must release as soon as the plane is carried by said parachutes.

Specifically the cycle of operation is: Close the boxes 6 with the covers 8 by placing the steel plates 9 next to the upper parts of the levers 15, a charge of about one-half ounce of gunpowder is passed through the exhaust openings 23 and secured to each one of the electric devices 14, move the boxes 11 from the position B to the position A, thereby moving the levers 15 with the slanting grooves 16 to hold the steel plates 9. The springs 19 press the safety bolt underneath the boxes 11 thereby moving the piston 21 in the cylinder 20. The levers 31 must be used to compress the springs 29 to produce indirect pressure from below against the steel plates 9 and a lock 32 must be used to hold said levers 31 at that position.

To use said devices in case of need, close the switch 25 to close the circuit with the conduits 28A, 28B and 28C to each one of the electrical devices 14 to explode said powder charges. The pressure of the exploding presses the pistons 21 which move the safety bolts 18 to release the boxes 11 which move to the position B, thereby moving the levers 15 with the slanting grooves 16 in a position to release in one moment every one of the steel plates 9. The springs 29 force said steel plates with said edge of the parachute, which is carried with said attachable means in the air to open and to fill the parachute quickly, any overpressure from the exploding escapes through the exhaust openings 23 and said attachable means release the edge of said parachutes to carry the aeroplane safely to the ground.

The cords 41 secured to the cords of the center parachute pull through said carrying of the aeroplane by said parachute the sliding member 33 to its upper position thereby moving the sliding member 36 to close the valve 38 on the feed line of the engine and to stop with the spring plates 40 the propeller in a horizontal direction.

By the landing of the plane, close the switch 51 to start the operation to turn said three parachutes innerside outward, two line conduits 52 to close the circuit between said switch and the storage battery 26 and two line conduits 53 between said switch and the motor 50 which drives the roller 49. Three cords 47 secured to said roller extending from the center of said expanded parachutes are secured to said roller and one each to said centers, to wind up said cords on said roller, to turn the innerside of said three parachutes outward by the closing of said switch.

What I claim as my invention to be secured by Letters Patent is—

1. In parachutes for aeroplanes having in combination open boxes secured in the upper parts of the wings and plane member, a parachute secured in each one of said boxes, means arranged for holding the cords of said parachutes with the upper rim of said boxes, a second open box with its opening below secured to the bottom of each one of said first named boxes, a third open box filled in each one of said second boxes to close the bottom of said boxes, a cover for each one of said first boxes and means provided to secure said covers to the upper parts of said parachutes to cover said parachutes with said covers in said boxes, steel plates secured to the rims of said covers, locking devices provided to lock with said steel plates said parachutes in said boxes, means arranged on said third boxes to open said locking means through the downward movement of said boxes, a charge of powder and an electric device to explode said powder arranged in said second and said third boxes, exhaust openings provided in said last named boxes to open when said third boxes are at their lowest position, a second locking means for holding said third boxes in said second boxes and means arranged to open said locks through the pressure of the exploding charge, springs provided to press indirectly against said steel plates and means provided for separately locking each one of said springs in fixed positions, an electric switch for the pilot, a two line circuit connection from said switch to said electric device and from said switch to a storage battery to provide means to explode with said electric device said charges, to open through the pressure of said exploding said second lock and to open by the downward movement of said third boxes said exhaust openings and said first lock to release said steel plates and to force with said indirect pressure of said springs said steel plates, said cover and said parachute in the air by the turning of said switch, means provided to stop the engine and to stop the propeller in a horizontal position through the carrying of said plane by said parachute, a second switch for the pilot and a device arranged to turn the inner side of said three parachutes outward by starting said device with said second switch.

2. In parachutes for aeroplanes having in combination on open box inserted in the upper part of the plane, the cords of a parachute secured to the rim of said box, a second open box with its opening below secured to the bottom of said first box, a third open box positioned with its bottom below is fitted in the second box, a cover for said first box secured to the upper part of said parachute to provide means to cover said parachute in said box, steel plates secured to said cover to provide means to lock with said steel plates said parachute in said box, locking means provided to lock said steel plates to said plane and means arranged to open said locking means through the downward movement of said third box, a charge of powder and an electric device to explode said charge arranged in said two last named boxes, exhaust openings provided to open when said third box is at its lowest position, a second safety lock arranged for holding said third box in its upper position and means provided to open said lock through the pressure of the exploding charge, springs provided to press from below against said steel plates, an electric switch for the pilot, two line circuit connections between said switch and said electric device and between said switch and a storage battery to provide means to explode the charge, to open by the pressure of said charge said second lock, to open by the downward moving of said third box said first lock and to open said exhaust openings, to release said steel plates to force with the pressure of said springs said steel plates with said cover and said parachute in the air by the turning of said switch.

3. In parachutes for aeroplanes having in combination an open box inserted in the upper part of said aeroplane, a closed parachute positioned in said box, rings for holding the cord of said parachute secured to the rim of said box, a cover for said box secured to the upper part of said parachute to provide means to cover said parachute in said box, steel plates secured to said cover arranged to lock said cover to said plane, a round plate below said box arranged for turning around its center, levers provided to hold with their upper parts said steel plates and long open slots in said turning plate to hold the lower parts of said levers in fixed positions to hold said steel plates and by turning said plate to move said lower parts in said slots in such a position to release with said upper parts said steel plates and to force with said springs said plates with said cover and said parachute in the air by the turning of said plate with said levers.

4. Same as in claim 1 in which the means to turn the inner side of said three parachutes outward comprising a motor driven roller, three cords secured to said roller, said cords extending from the inner side of each one of the centers of said expanded parachutes to said roller 49, an electric switch for the pilot, two line circuit connections from said switch to said motor and from said switch to a storage battery to provide means to wind up said three cords on said roller to turn the inner side of said parachutes outward by the closing of said switch.

5. Same as in claim 1 in which the means to stop the engine and to stop the propeller in a horizontal positon through the carrying of said plane by said parachute comprising a member arranged for sliding in a vertical position in an opening in the bottom of said first box, a spring provided to pull said member to its lowest position, a second member arranged for sliding in a transverse direction to said first named member, means provided to move said second member through the movements of said first member, a short steel plate secured to said second member arranged to stop the propeller at a given position, a valve on the feed line of the engine operatively connected on said member and short cords secured to said first member and to the nearest cords of the parachute in such a manner to close said valve and to stop said propeller through the carrying of said plane with said parachutes.

6. Same as in claim 1 in which the means to compress the springs to force with indirect pressure said steel plates with said cover and said parachute in the air comprising a lever arranged to carry said spring, a fork member secured on the other end of said lever arranged to press with said fork member from below against said steel plate, a handy lever for the pilot to compress said spring with said member and a lock provided to lock with said lever and said spring in said compressed position.

7. In parachutes for aeroplanes having in combination an open box secured in the upper part of the plane arranged for holding a parachute, a second open box with its opening below secured to the bottom of said first box, a third open box with its opening upward fitted in said second box, a cover of said first box secured to the upper part of said parachute, steel plates secured to each corner of said cover, a locking device provided to lock each one of said steel plates to said plane, a source of power between each one of said plates and said plane, means on said third box to open said locking means by the downward moving of said third box, a spiral spring inserted in said second and said third box, an oblong opening in the bottom of said third box, a straight member arranged for turning secured in the bottom of said second box in such a manner to give said member a fixed position in the center of said oblong opening, an oblong member which must have the size to pass through said oblong opening is secured to said straight member at such a position to hold with a half turn of said member said spring with said third box in a compressed position, a member secured to said straight member to hold said box at its lowest position and a handy member for the pilot secured to the bottom of said straight member to provide means to release said spiral spring to open said locking means and to force with said source of power said steel plates with said cover and said parachute in the air by moving said handy member one half turn.

8. In parachutes for aeroplanes having in combination an open box secured in the upper part of the plane arranged for holding a parachute, a second open box with its opening below secured to the bottom of said first box, a third open box with its opening upward fitted in said second box, a cover for said first box secured to the upper part of said parachute, steel plates secured to each corner of said cover, attachable means are secured to each one of said plates and to some parts of the edge of said parachute to connect each one of said plates to one of said parts, a locking device provided to lock each one of said steel plates to said plane, a source of power between each one of said plates and said plane, means on said third box to open said locking means by the downward moving of said third box, a spiral spring inserted in said second and said third box its ends secured to the bottoms of said boxes, an oblong opening in the center of the bottom of said third box, a straight member secured for turning in the center of said second box in such a manner to give said member a fixed position in the center of said oblong opening, an oblong member which must have the size to pass through said oblong opening is secured to said straight member at such a position to hold with a half turn of said member said spring with said third box in a compressed position, a member secured to said straight member to hold said box at its lowest position and a handy member for the pilot secured to the bottom of said straight member to provide means to release said spiral spring to open said locking means on said steel plates and to force with said source of power said steel plates with said parts of the edge of said parachute in the air and to release said attachable means through the inflating of air in said parachute to carry said plane.

Signed at New York City, in the county of New York and State of New York, this 19th day of Oct., 1928 A. D.

CHARLES KESSES.